United States Patent
Long et al.

(10) Patent No.: US 10,915,862 B2
(45) Date of Patent: Feb. 9, 2021

(54) SYSTEM FOR DOCUMENTING PRODUCT USAGE BY RECOGNIZING AN ACOUSTIC SIGNATURE OF A PRODUCT

(71) Applicant: Kimberly-Clark Worldwide, Inc., Neenah, WI (US)

(72) Inventors: Andrew M. Long, Neenah, WI (US); Jonathan D. Boulos, Neenah, WI (US); Jose A. Corella, III, Flower Mound, TX (US); Daryl S. Bell, Appleton, WI (US); Joseph P. Fell, Kaukauna, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 16/771,830

(22) PCT Filed: Dec. 20, 2018

(86) PCT No.: PCT/US2018/066686
§ 371 (c)(1),
(2) Date: Jun. 11, 2020

(87) PCT Pub. No.: WO2019/126437
PCT Pub. Date: Jun. 27, 2019

(65) Prior Publication Data
US 2021/0012283 A1      Jan. 14, 2021

Related U.S. Application Data

(60) Provisional application No. 62/608,112, filed on Dec. 20, 2017.

(51) Int. Cl.
*G06F 17/00* (2019.01)
*G06Q 10/08* (2012.01)
(Continued)

(52) U.S. Cl.
CPC ......... *G06Q 10/0875* (2013.01); *G06F 16/65* (2019.01); *G06F 16/683* (2019.01);
(Continued)

(58) Field of Classification Search
USPC .............................. 235/375; 705/29
See application file for complete search history.

(56) References Cited

U.S. PATENT DOCUMENTS

| D485,461 S | 1/2004 | Sams et al. |
| D540,501 S | 4/2007 | Wang |

(Continued)

FOREIGN PATENT DOCUMENTS

| CN | 2313564 Y | 4/1999 |
| CN | 202208487 U | 5/2012 |

(Continued)

OTHER PUBLICATIONS

Nooralahiyan, A.Y. et al., "Vehicle classification by acoustic signature", Mathematical and Computer Modelling, vol. 27, Issues 9-11, May-Jun. 1998, pp. 205-214.

(Continued)

*Primary Examiner* — Tuyen K Vo
(74) *Attorney, Agent, or Firm* — Kimberly-Clark Worldwide, Inc.

(57) ABSTRACT

A system for documenting product usage of a product is disclosed. The system can include a memory device configured to store an acoustic signature model. The acoustic signature model can be representative of an acoustic profile of the product emitted during use of the product. The system can also include an auditory capture mechanism and a processor. The auditory capture mechanism can be configured to monitor a product use environment for a potential use sound profile and capture the potential use sound profile. The processor can be configured to analyze the captured (Continued)

US 10,915,862 B2

Page 2 potential use sound profile in relation to the acoustic signature model and to signal a qualifying match when the captured potential use sound profile meets the acoustic signature model. The system can be configured to document a product usage when the processor signals the qualifying match.

20 Claims, 5 Drawing Sheets

(51) Int. Cl.
  G06N 3/04        (2006.01)
  G06F 16/683      (2019.01)
  H04W 4/38        (2018.01)
  G06F 16/65       (2019.01)
  G06Q 10/00       (2012.01)

(52) U.S. Cl.
  CPC .............. *G06N 3/04* (2013.01); *G06Q 10/30* (2013.01); *H04W 4/38* (2018.02)

(56) References Cited

U.S. PATENT DOCUMENTS

| | | | |
|---|---|---|---|
| D564,169 S | 3/2008 | Wang | |
| 7,700,821 B2 | 4/2010 | Ales, III et al. | |
| 8,274,393 B2 | 9/2012 | Ales et al. | |
| 8,775,013 B1 | 7/2014 | Smailus | |
| 8,973,444 B2 | 3/2015 | Hill et al. | |
| 9,030,313 B1* | 5/2015 | Pearson | B60N 2/28 340/457 |
| D737,013 S | 8/2015 | Beumer | |
| D747,061 S | 1/2016 | Valderrama et al. | |
| 9,289,090 B2 | 3/2016 | Yuan et al. | |
| 9,470,776 B2 | 10/2016 | Chan et al. | |
| D775,447 S | 12/2016 | Stravitz | |
| 9,591,721 B2 | 3/2017 | Nolan et al. | |
| 2003/0206109 A1 | 11/2003 | Yang | |
| 2006/0039569 A1* | 2/2006 | Antaki | G10K 11/17854 381/71.1 |
| 2007/0047568 A1 | 3/2007 | Wang et al. | |
| 2007/0194893 A1 | 8/2007 | Deyoe | |
| 2008/0214949 A1 | 9/2008 | Stivoric et al. | |
| 2008/0266122 A1 | 10/2008 | Ales et al. | |
| 2012/0220969 A1 | 8/2012 | Jang et al. | |
| 2013/0076509 A1 | 3/2013 | Ahn | |
| 2013/0123654 A1 | 5/2013 | Rahamim et al. | |
| 2014/0032268 A1 | 1/2014 | Kruglick et al. | |
| 2015/0087935 A1 | 3/2015 | Davis et al. | |
| 2015/0157512 A1 | 6/2015 | Abir | |
| 2015/0316512 A1 | 11/2015 | Nicq | |
| 2015/0379463 A1 | 12/2015 | Sarangi | |
| 2016/0016041 A1* | 1/2016 | Giedwoyn | G16H 40/67 700/91 |
| 2016/0017905 A1 | 1/2016 | Cascolan et al. | |
| 2016/0125759 A1 | 5/2016 | Dougherty et al. | |
| 2016/0334771 A1 | 11/2016 | Laulagnet et al. | |
| 2017/0186124 A1 | 6/2017 | Jones et al. | |
| 2017/0193825 A1 | 7/2017 | Schlechter et al. | |
| 2017/0205783 A1 | 7/2017 | Tannenbaum et al. | |
| 2017/0206273 A1 | 7/2017 | Tannenbaum et al. | |
| 2017/0252225 A1 | 9/2017 | Arizti et al. | |
| 2017/0354547 A1 | 12/2017 | Abir | |
| 2018/0133583 A1* | 5/2018 | Tran | H04W 84/18 |

FOREIGN PATENT DOCUMENTS

| | | |
|---|---|---|
| CN | 203216600 U | 9/2013 |
| CN | 103989557 A | 8/2014 |
| CN | 204624438 U | 9/2015 |
| CN | 204776976 U | 11/2015 |
| CN | 105752557 A | 7/2016 |
| CN | 105947488 A | 9/2016 |
| CN | 106429085 A | 2/2017 |
| CN | 106429114 A | 2/2017 |
| CN | 107133698 A | 9/2017 |
| CN | 206480052 U | 9/2017 |
| EP | 1091773 B1 | 2/2007 |
| IN | 201621038041 A | 12/2016 |
| IN | 201721011276 A | 9/2017 |
| JP | 2003141256 A | 5/2003 |
| KR | 20110111194 A | 10/2011 |
| KR | 20160038573 A | 4/2016 |
| KR | 20160133588 A | 11/2016 |
| KR | 101705278 B1 | 2/2017 |
| KR | 101731207 B1 | 4/2017 |
| TW | M515376 U | 1/2016 |
| WO | 02080831 A1 | 10/2002 |
| WO | 16161483 A1 | 10/2016 |
| WO | 17066513 A1 | 4/2017 |
| WO | 17074406 A1 | 5/2017 |

OTHER PUBLICATIONS

Sharma, Pradmod et al., "Diagnosis of Motor Faults Using Sound Signature Analysis", International Journal of Innovative Research in Electrinics, Instrumentation and Control Engineering, vol. 3, Issue 5, May 2015.

Nooralahiyan, Amir Y et al., "A field trial of acoustic signature analysis for vehicle classification", Researchgate, Aug. 1997, https://www.researchgate.netpublication/223533971_A_field_trial_of_acoustic_signature_analysis_for_vehicle_classification.

Kakar, Varun Kumar et al., "Techniques of Acoustic Feature Extraction for Detection and Classification of Ground Vehicles", International Journal of Emerging Technology and Advanced Engineering, Feb. 2013, http://www.ijetae.com/files/Volume3Issue2/IJETAE_0213_70.pdf.

Li, Weidong et al., "Detection of Induction Motor Faults: A Comparison of Stator Current", Vibration and Acoustic Methods Journal of Vibration and Control, Aug. 1, 2004, http://citeseerx.ist.psu.edu/viewdoc/download?doi=10.1.1.913.3017&rep=rep1&type=pdf.

Wang, James M., "An Internet Based System to Monitor Aircraft's Health", MIT, Jun. 1, 2001, pp. 12, 13, 25, https://dspace.mit.edu/bitstream/handle/1721.1/91731/48271993-MIT.pdf?sequence=2.

Mamun et al., "Real time solid waste bin monitoring system framework using wireless sensor network", Institute of Electrical and Electronics Engineers Inc., Jan. 15-18, 2014, https://researchgate.net/profile/MA_Hannan/publication/286593286_Real_time_solid_waste_bin_monitoring_system_framework_using_wireless_sensor_network/links/569477e508ae425c68964691.pdf.

Vicentini, F. et al., "Sensorized waste collection container for content estimation and collection optimization", Waste Management, May 2009, https://www.ncbi.nlm.nih.gov/pubmed/19103480.

Wen, Ming-Hui, "Goo9: A wireless sensor network system for wet diaper detection", International Conference on Applied System Innovation (ICASI), May 2017, https://www.researchgate.net/publication/318694628_Goo_A_wireless_sensor_network_system_for_wet_diaper_detection.

Taichun, Qin et al., "Design of GSM-Based Tele-monitoring and Alarm System for Disposable Diaper", Green Computing and Communications, Aug. 2013, https://www.researchgate.net/publication/261229615_Design_of_GSM-Based_Tele-monitoring_and_Alarm_System_for_Disposable_Diaper.

Co-pending U.S. Appl. No. 16/771,849, filed Jun. 11, 2020, by Long et al. for "System for Intervening and Improving the Experience of the Journey of an Absorbent Article Change".

* cited by examiner

SYSTEM FOR DOCUMENTING PRODUCT USAGE BY RECOGNIZING AN ACOUSTIC SIGNATURE OF A PRODUCT

TECHNICAL FIELD

The present disclosure relates to systems for documenting usage of products. More specifically, the present disclosure relates to systems for documenting usage of products by recognizing an acoustic signature of such products.

BACKGROUND OF THE DISCLOSURE

People use a variety of products that are considered consumable, in that they have a finite nature. Some consumable products are consumed on a basis that may be event-specific, while others are used on a more frequent cadence such as monthly, daily, or even multiple times per day. As an example, an absorbent article, such as a diaper, may be a product that is used several times per day.

Documenting usage of such products, especially those that are used and replaced on a frequent basis, can be time-consuming, inconvenient, and inaccurate. Without documenting product usage, the understanding of a user's current inventory can be less than actually believed to be, possibly leading a user to purchase more of such product at an inconvenient time or situation after discovering the true inventory of actual product remaining at a location, such as at a household or care facility. This may be especially true where more than one user is using, replacing, or purchasing the product. Additionally, estimating how many of such products may be used in a typical day may not be an accurate representation of current inventory either, as product usage characteristics may vary from user to user, or even vary within a specific user based on various conditions.

Thus, there is a desire for systems that document product usage in a manner that is more convenient and less time consuming.

SUMMARY OF THE DISCLOSURE

In one embodiment, a system for documenting product usage of a product can include a memory device. The memory device can be configured to store an acoustic signature model. The acoustic signature model can be representative of an acoustic profile of the product emitted during use of the product. The system can also include an auditory capture mechanism. The auditory capture mechanism can be configured to monitor a product use environment for a potential use sound profile and capture the potential use sound profile while the product is being used. The system can further include a processor in electrical communication with the auditory capture mechanism. The processor can be configured to analyze the captured potential use sound profile in relation to the acoustic signature model. The processor can be further configured to signal a qualifying match when the captured potential use sound profile meets the acoustic signature model. The system can be configured to document a product usage when the processor signals the qualifying match.

In another embodiment, a computer program product comprising code embodied on a non-transitory computer-readable medium. The computer program can be configured to be executed on one or more processors. The computer program product can be configured to perform operations of storing an acoustic signature model of a product. The acoustic signature model can be representative of an acoustic profile of the product emitted during use of the product. The computer program product can also be configured to perform the operation of monitoring a product use environment for a potential use sound profile with an auditory capture mechanism. The computer program product can also be configured to perform the operation of capturing the potential use sound profile with the auditory capture mechanism and analyzing the potential use sound profile in relation to the acoustic signature model of the product. The computer program product can further be configured to perform the operation of signaling a qualifying match when the captured potential use sound profile meets the acoustic signature model of the product. The computer program product can additionally be configured to perform the operation of documenting a product usage when a qualifying match is signaled.

BRIEF DESCRIPTION OF DRAWINGS

A full and enabling disclosure thereof, directed to one of ordinary skill in the art, is set forth more particularly in the remainder of the specification, which makes reference to the appended figures in which.

Figure 1:
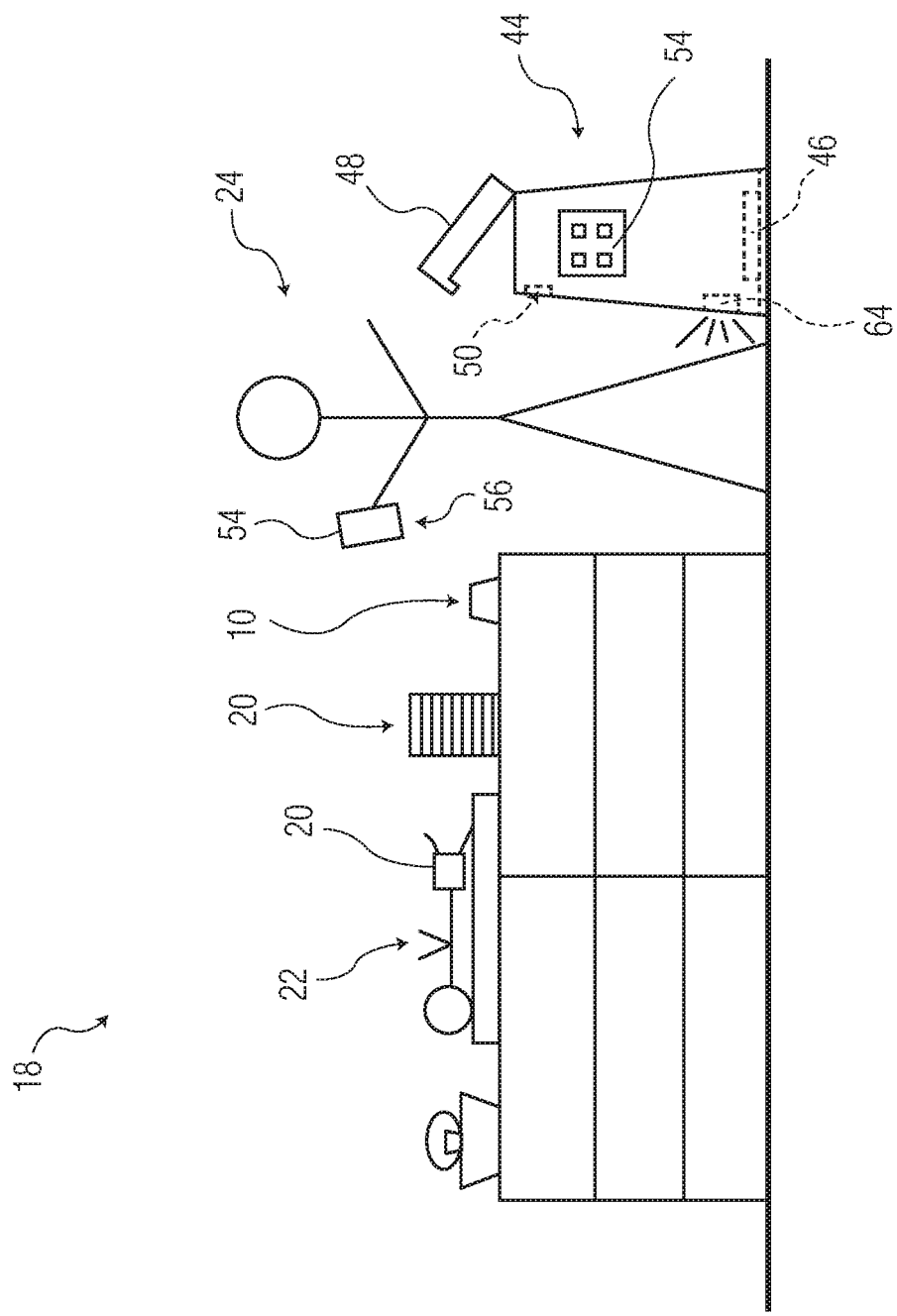
FIG. 1 is a front plan view of a product use environment.

Repeat use of reference characters in the present specification and drawings is intended to represent the same or analogous features or elements of the disclosure.

DETAILED DESCRIPTION OF THE DISLOSURE

Figure 2:
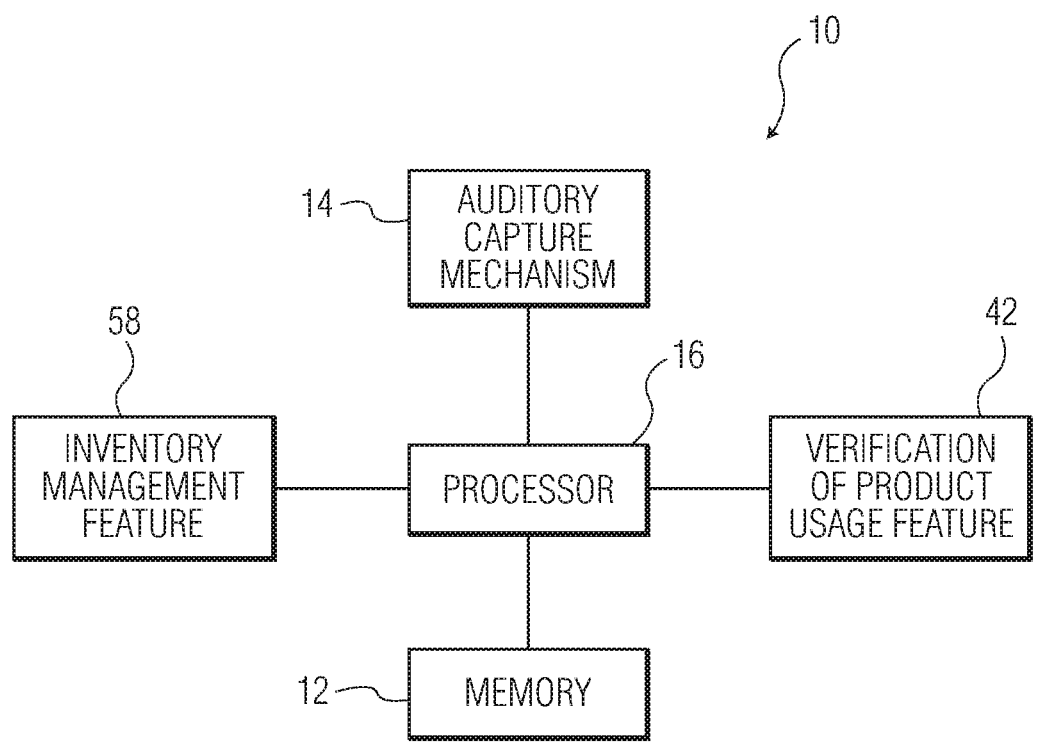
FIG. 2 is a schematic diagram of a system for documenting product usage.

In an embodiment, the present disclosure is generally directed towards systems 10, such as that illustrated in FIGS. 1 and 2, for documenting usage of products by recognizing an acoustic signature of such products. Such systems can include an inventory management system that helps to helps to maintain a user's inventory by documenting usage of a product based on recognition of sounds emitted from the product during usage of the product itself. This provides a system for documenting product usage that is convenient and accurate. In one aspect of the disclosure, a computer program product can include code embodied on a non-transitory computer-readable medium for performing the actions described herein for the system 10.

Each example is provided by way of explanation and is not meant as a limitation. For example, features illustrated or described as part of one embodiment or figure can be used on another embodiment or figure to yield yet another embodiment. It is intended that the present disclosure include such modifications and variations.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the invention.

Definitions:

The term "absorbent article" refers herein to an article which may be placed against or in proximity to the body (i.e., contiguous with the body) of the wearer to absorb and contain various liquid, solid, and semi-solid exudates discharged from the body. Such absorbent articles, as described herein, are intended to be discarded after a limited period of use instead of being laundered or otherwise restored for reuse. It is to be understood that the present disclosure is applicable to various disposable absorbent articles, including, but not limited to, diapers, diaper pants, training pants, youth pants, swim pants, feminine hygiene products, including, but not limited to, menstrual pads or pants, incontinence products, medical garments, surgical pads and bandages, other personal care or health care garments, and the like without departing from the scope of the present disclosure.

The term "bonded" or "coupled" refers herein to the joining, adhering, connecting, attaching, or the like, of two elements. Two elements will be considered bonded or coupled together when they are joined, adhered, connected, attached, or the like, directly to one another or indirectly to one another, such as when each is directly bonded to intermediate elements. The bonding or coupling of one element to another can occur via continuous or intermittent bonds.

The term "electronically connected" or "in electrical communication" means that a component is configured to electronically communicate with another component through the same circuit, connected by wire, infrared (IR), radio frequency (RF), Bluetooth, wifi, cellular, or any other suitable connection means.

The term "nonwoven" refers herein to materials and webs of material which are formed without the aid of a textile weaving or knitting process. The materials and webs of materials can have a structure of individual fibers, filaments, or threads (collectively referred to as "fibers") which can be interlaid, but not in an identifiable manner as in a knitted fabric. Nonwoven materials or webs can be formed from many processes such as, but not limited to, meltblowing processes, spunbonding processes, carded web processes, etc.

The term "user" refers herein to one who uses the system. In the context of a product of an absorbent article, a "user" can be a caregiver who fits the absorbent article, such as, but not limited to, a diaper, diaper pant, training pant, youth pant, incontinent product, or other absorbent article about the wearer of one of these absorbent articles. A user and a wearer can be one and the same person in some situations.

FIGS. 1 and 2 describe one exemplary embodiment of a system 10 for documenting product usage. While the system 10 can be used to document product usage of a variety of different products, it is most beneficial to use the systems 10 as described herein for documenting product usage of products that are consumables. In some embodiments, it is particularly useful to utilize the systems 10 herein for products that are consumed at a rather high frequency. One such example of a product that is consumed at a high frequency is an absorbent article, however, it is to be understood that the systems 10 as described herein are not limited to documenting product usage of only such products.

In one exemplary embodiment, a system 10 can include a memory device 12, an auditory capture mechanism 14, and a processor 16. The components of the system 10 can be configured to be on a single device, or can be located on more than one device and be configured to be electronically connected with one another. In some embodiments, it is contemplated that one or more components of the system 10 can be configured to be resident on or communicate with a device that performs other functions system 10, such as a smart speaker device, for example, a Google Home device or an Amazon Echo device. Alternatively or additionally, the system 10 can be configured to be resident on or communicate with other devices, including, but not limited to, smartphones, wearable smart devices (e.g., watches), smart TVs, remote controls, cars, computers, and tablets.

As portrayed in FIG. 1, the system 10 can be utilized in at least one product use environment 18. The product use environment 18 may vary depending on which product(s) the system 10 is configured to monitor and document usage of, as well as even the particular habits of each user. For example, FIG. 1 displays that the system 10 can be configured for use in a product use environment 18 that is a changing area for an absorbent article 20 worn by a wearer 22 and changed by a user 24, such as a parent. Such a product use environment 18 may be a portion of a room of a house, an entire room, a hallway, or other area where the product is frequently used. In some embodiments, the system 10 can be configured to have more than one auditory capture mechanism 14 such that more than one product use environment 18 can be monitored simultaneously and without having to move any auditory capture mechanisms 14. In some embodiments, the system 10 can be configured such that it is used on or as part of a device that a user 24 typically carries with himself/herself (such as a smartphone), and as such, can monitor any product use environment 18 that the user 24 finds himself/herself.

The memory system 12 can be configured to store one or more acoustic signature models. An acoustic signature model, as used herein, means data, of various forms, that can be representative of an acoustic profile of a product emitted during use of the product. Examples of various forms of acoustic signature models can include, but are not limited to: a sound profile that is documented in terms of amplitude versus time, frequency profile (frequency versus time), a sound pressure profile, and a trained model 41 that can be analyzed with neural network analysis (as discussed further below). The memory system 12 can be configured to store one or more acoustic signature models for one or more different products, which may or may not be related. The memory system 12 can be configured to store these one or more acoustic signature model(s) of product(s) in a database. Such a database can be stored on either a hard drive, solid-state memory, or on one or more servers accessible remotely through a network, such as a public or private local area network, a local or wide area private intranet, or a wide area public interwork network such as the Internet. Alternatively or additionally, the memory system 12 can be configured to store the one or more acoustic signature models of product(s) within an integrated circuit or field-programmable gate array (FPGA).

In the exemplary embodiment where the product is an absorbent article 20, an acoustic signature model can be representative of an acoustic profile that is emitted by a fastening system 30 (as labeled in FIG. 3) being disengaged from a fastened condition, such as when the absorbent article 20 is in the process of being changed. Such an acoustic signature model can correlate to the product being fully consumed and can signify a product usage.

Figure 3:
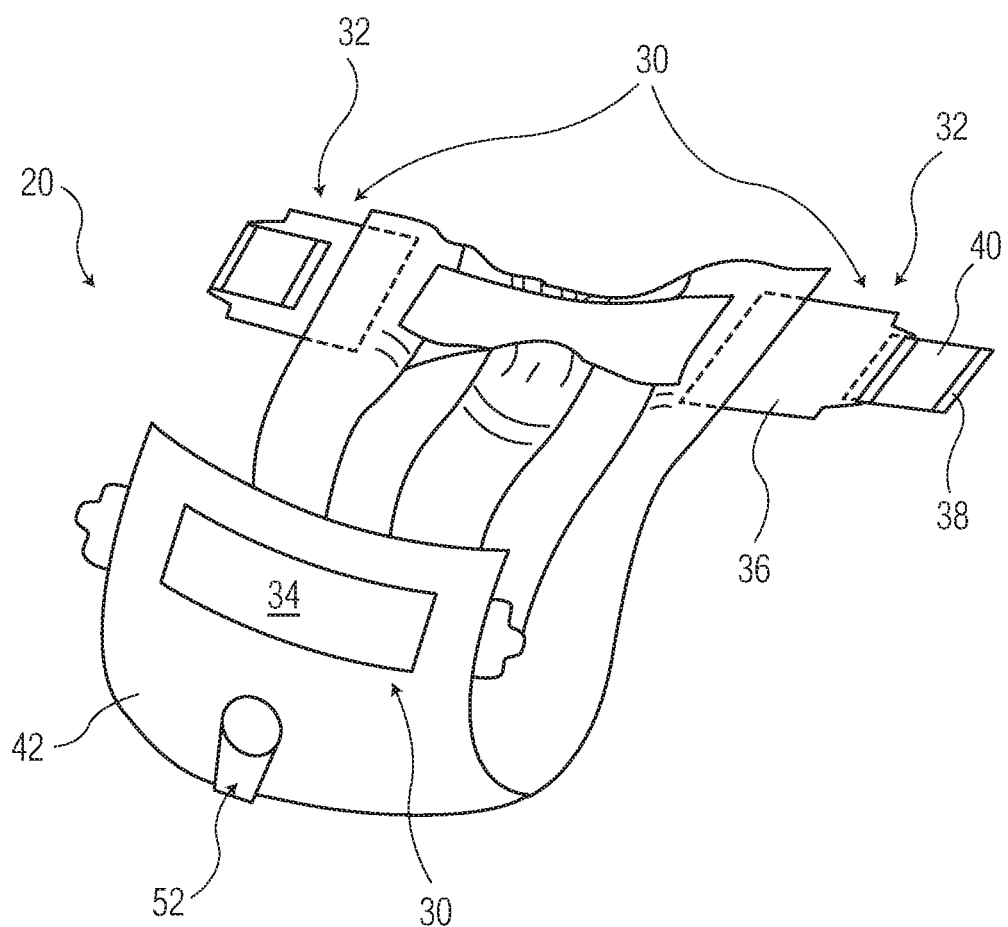
FIG. 3 is a top perspective view of an absorbent article in an unfastened, relaxed condition.

For example, FIG. 3 illustrates a fastening system 30 on an absorbent article 20 that is currently in a relaxed, unfastened condition. Although the absorbent article 20 displayed in FIG. 3 is an open diaper, the system 10 as described herein could be used with a variety of other products, including, but not limited to, other embodiments of the absorbent articles including, but not limited to, training pants, youth pants, adult incontinence garments, and feminine hygiene articles. The fastening system 30 of the absorbent article 20 can be configured to secure the absorbent article 20 about the waist of the wearer 22 while the product is being used. The fastening system 30 can include one or more back fasteners 32 and one or more front fasteners 34. As illustrated in FIG. 3, the absorbent article 20 can include two back fasteners 32 and one front fastener 34, however, other variations could be employed in a fastening system 30. The back fasteners 32 can include one or more materials bonded together to form a composite ear as is known in the art. For example, the composite fastener may be composed of a main ear component 36 (which can demonstrate elastic properties), a nonwoven carrier or base 38, and a fastening component 40 (as labeled on the right, back fastener in 32 in FIG. 3). In a packaged condition, the fastening component 40 may engage the main ear component 36, as shown in the left, back fastener 32 in FIG. 3. The fastening component 40 can be, in some embodiments, a hook material that engages with a loop material that can form the front fastener 34. Additionally or alternatively, the fastening component 40 can include a tape material that engages with the front fastener 34. It is to be understood that the front fastener 34 may be a discrete component on the outer cover 42 of the absorbent article 20, or may be a portion of the outer cover 42 itself.

When the fastening component 40 of each of the back fasteners 32 is engaged with the front fastener 34, the absorbent article 34 can be in the fastened conditioned and secured about the waist of the wearer 22. However, when the absorbent article 20 is insulted with body exudates it can be desired to replace the used absorbent article 20 with a new absorbent article 20, such as in the product use environment 18 illustrated in FIG. 1, the fastening system 30 is disengaged and provides an acoustic signature. The acoustic signature can be the sound emitted by one of the fastening components 40 of one of the back fasteners 32 being disengaged from the front fastener 34. Alternatively, the acoustic signature can be the two successive sounds emitted by both of the fastening components 40 of the two back fasteners 32 being disengaged from the front fastener 34. As noted above, this acoustic signature model can be representative of a full product use of the product, and as will be described further below, can document a product usage as part of inventory management.

Of course, it is contemplated that acoustic profiles emitted during use of a product can exist for various other products that can signify a product being used and can signify a product usage and can be used for developing an acoustic signature model for the system 10 described herein. Additional examples of acoustic profiles emitted during use of a product that can relate to absorbent articles can include the acoustics associated with tearing the side seam of a training pant and removing the peel strip from the adhesive of a feminine care pad. Acoustic profiles emitted during use of a product that can signify a product being used can apply to other products as well, such as the acoustics associated with dispensing a product from packaging or a container, such as, for example, a wet wipe being dispensed from rigid flip-top (RFT) dispenser, or a facial tissue being dispensed through an opening in a tissue carton. Furthermore, acoustic profiles emitted during use of a product that can signify a product being used and that can signify a product usage can include acoustics associated with the unrolling of a paper towel or bath tissue roll, or the tearing of paper towel or bath tissue, such as, for example, at a perforation line. Acoustic signature models can be developed for such acoustic profiles and can be used in the system 10 described herein that can be beneficial for documenting product usage as part of inventory management, as further described below.

Referring back to the system 10 in FIGS. 1 and 2, the system 10 can also include an auditory capture mechanism 14. The auditory capture mechanism 14 can be a microphone. The auditory capture mechanism 14 can be configured to monitor a product use environment 18 for a potential use sound profile. As noted above, in some embodiments, the system 10 can be configured to include more than one auditory capture mechanism 14 such that more than one product use environment 18 can be monitored. The auditory capture mechanism(s) 14 can be configured to capture a potential use sound profile while the product is being used. An auditory capture mechanism 14 can be located on the same physical device as the memory device 12 of the system 10, or the two components 12, 14 of the system 10 may be physically separated, but configured to be electronically connected. The auditory capture mechanism 14 can be configured to include or work with other known equipment such as an amplifier (not shown) for amplifying sounds within the product use environment 18 and an analog to digital converter (not shown), as known by one of ordinary skill in the art.

The system 10 can also include a processor 16. The processor 16 can be in electrical communication with the auditory capture mechanism(s) 14. The processor 16 can process via various computing types/methods, including edge-computing, fog-computing, and/or cloud computing. As such, processing by the processor 16 can take place at the edge (e.g., locally), near the edge (e.g., a gateway or nearby computing device), or in the cloud (e.g., public, private, hybrid). The processor 16 can be configured to analyze any potential use sound profile captured by the auditory capture mechanism(s) 14. The analysis of a potential use sound profile may vary on the particular desired acoustic signature model format. However, in general, the processor 16 is configured to analyze a captured potential use sound profile in relation to the acoustic signature model.

Figure 4A:
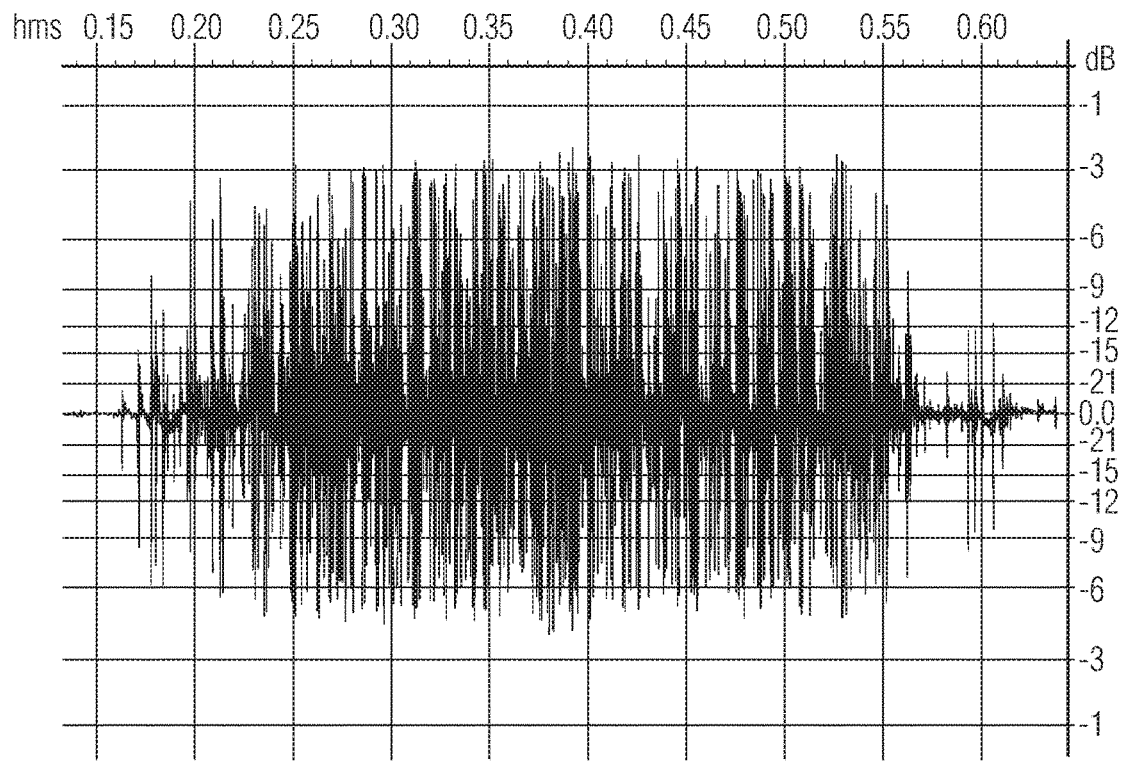
FIG. 4A is an exemplary sound profile of a fastening component of an absorbent article being unfastened providing an acoustic signature model.
Figure 4B:
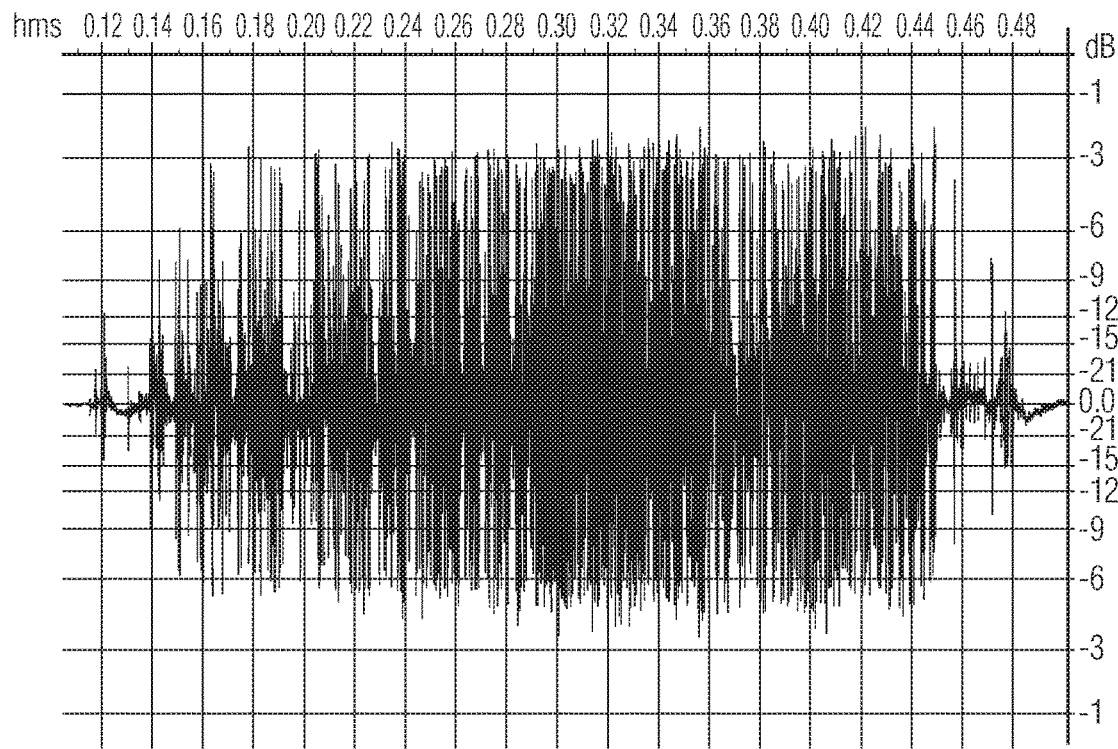
FIG. 4B is another exemplary sound profile of a fastening component of an absorbent article being unfastened providing an acoustic signature model.

As one example, the acoustic signature model can be configured as a sound profile that is documented in terms of amplitude versus time. For example, FIGS. 4A and 4B display two exemplary sound profiles captured by an auditory capture mechanism 14. FIG. 4A is representative of a sound profile of a fastening component 40 of a back fastener 32 being unfastened from a front fastener 34 on a HUGGIES® Little Snugglers Size 1 diaper and FIG. 4B is representative of a sound profile of a fastening component 40 of a back fastener 32 being unfastened from a front fastener 34 on a HUGGIES® Little Movers Size 3 diaper. In such an embodiment, the auditory capture mechanism 14 can capture a potential use sound profile as it monitors the product use environment 18. The auditory capture mechanism 14 can transmit the potential use sound profile to the processor 16 of the system 10 for analysis. The processor 16 can be configured to analyze a captured potential use sound profile configured as an amplitude versus time sound profile in relation to the acoustic signature model by known techniques such as spectral analysis using Fast Fourier Transform.

The processor 16 can be configured to signal a qualifying match when the captured potential use sound profile meets the acoustic signature model. As used herein, a captured potential use sound profile can be considered to "meet" the acoustic signature model when the analysis technique utilized by the processor 16 provides a certain confidence level that a match is obtained. For example, in the embodiment currently being described, the processor 16 can be configured to signal a qualifying match when the processor's analysis provides a 75% confidence level that the captured potential use sound profile matches the acoustic signature model that is configured as a sound profile of amplitude versus time. It is intended that the confidence level may be configured to be different than the example provided above, based on various factors including, but not limited to, the analysis technique employed by the processor 16.

Figure 5:
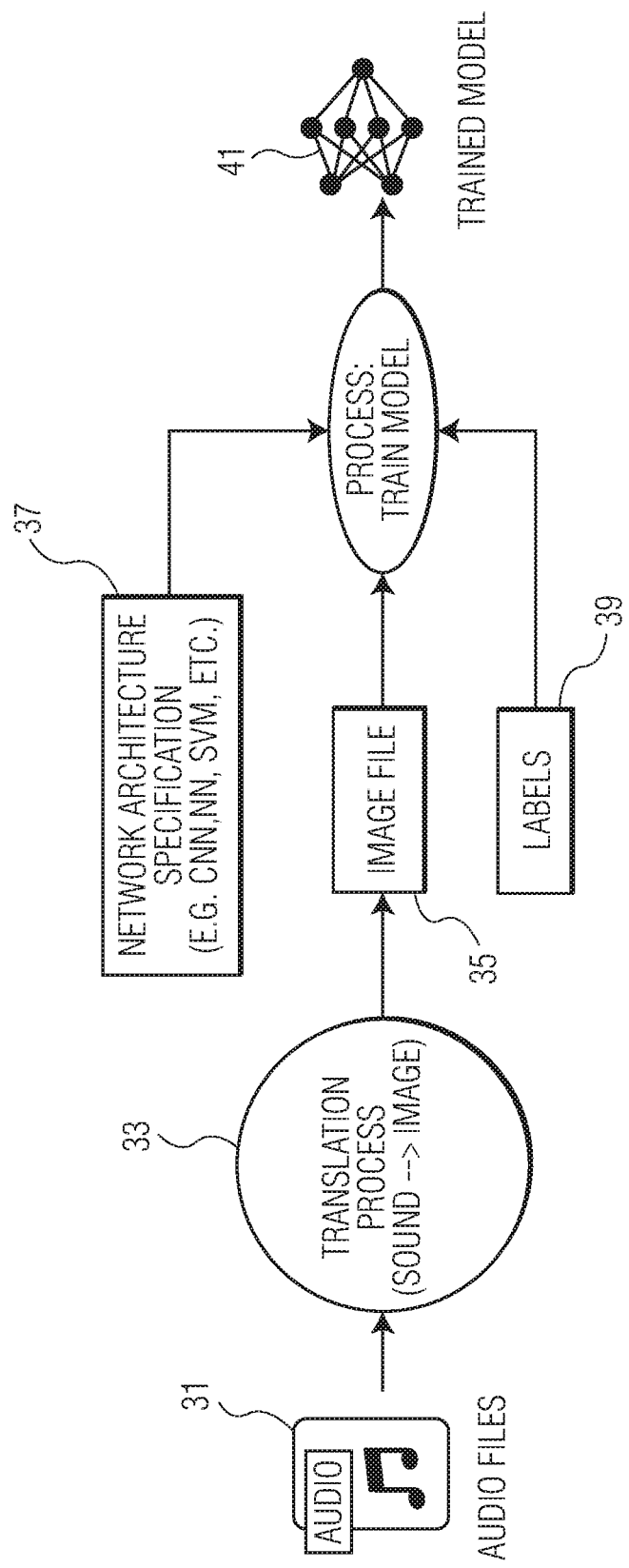
FIG. 5 is a schematic diagram of an exemplary neural network analysis that can be used to create a trained model for use as an acoustic signature model with the system as described herein.

An alternative analysis technique the processor 16 can be configured to utilize is a neural network analysis. As depicted in FIG. 5, history of audio files 31 can be put through a translation process 33, effectively translating a sound file into an image file 35. Various network architecture specifications 37, including, but not limited to, convolutional neural networks (CNN), neural networks (NN), and support vector machine (SVM), can be utilized with the image file 35 and one or more labels 39 corresponding to respective products to create a trained model 41 that can serve as an acoustic signature model for the system 10 herein. The auditory capture mechanism 14 can capture a potential use sound profile and then the processor 16 can analyze the capture potential use sound profile utilizing the trained model 41 developed from neural network analysis described above. As one example, TensorFlow is an open-source software library for machine intelligence (https://www.tensorflow.org/) that can be employed by a processor 16 to analyze the captured potential use sound profile in relation to the trained model 41 serving as the acoustic signature model. One benefit to the processor 16 employing neural network analysis techniques is that the trained model 41 can be updated based on feedback to update and/or evolve the trained model 41 providing further accuracy to the system 10.

In utilizing a trained model 41 as the acoustic signature model for the system 10, the processor 16 can be configured to signal a qualifying match when the captured potential use sound profile meets the acoustic signature model. In a CNN, for example, the analysis of the processor 16 as to whether a captured potential use sound profile meets the acoustic signature model can be based on the confidence level that a match is obtained through classification. As with most CNNs, the last layer in a CNN can be a fully-connected (FC) layer that can compute one or more class scores, with each class representing an acoustic signature model stored by the system 10. The FC layer verifies the output of a previous layer (that can represent activation maps of high level features) and determines which features most correlate to a particular class. The FC layer can take an input volume (based on the output of the proceeding layer) and can output an N-dimensional vector, where N is the number of classes that the system 10 is configured to monitor. From this, the FC layer can determine what high-level features most strongly correlate to a particular class and has particular weights so that when the processor 16 computes the products between the weights and the previous layer, a probability can be generated for the one or more classes. At the end of the CNN analysis, the processor 16 can produce an array of numbers that describe the probability (or confidence level) that an image file 35 (captured potential use sound profile) of being a certain class (or acoustic signature model) that is stored by the by the system 10.

Regardless of the analysis technique employed by the processor 16, the system 10 can be further configured to document a product usage when the processor 16 signals a qualifying match. As one benefit, the system 10 documenting a product usage can provide one input to establishing a current product inventory for the user, as will be described in further detail below. Additional benefits can include providing data related to how, when, and how often a product is used.

As illustrated in FIG. 2, in some embodiments, the system 10 can include a verification of product usage feature 42. The verification of product usage feature 42 can be implemented to increase the accuracy of the system 10 for documenting product usage. The processor 16 can be configured to process a verification of product usage input as part of, or in addition to, analyzing the captured potential use sound profile in relation to the acoustic signature model.

In one example, a verification of product usage feature 42 can include the system 10 receiving one or more inputs from a disposal receptacle 44, as illustrated in FIG. 1. The disposal receptacle 44 can include a weight sensor 46 that is configured to weigh the contents of the disposal receptacle 44. The weight sensor 46 can provide a verification of product usage input to the processor 16. In the embodiment illustrated in FIGS. 1-3 where the system 10 is being employed to document product usage of absorbent articles 20, the weight sensor 46 of the disposal receptacle 44 can provide a verification of product usage input to the processor 16 to provide further information to the processor of an increase in sensed weight in the disposal receptacle 44. In one embodiment, this input can be utilized by the processor 16 to help guide or confirm the processor's 16 analysis of the captured sound profile in relation to the acoustic signature model to inform before or after signaling a qualifying match. The disposal receptacle 44 can also include a lid 48 and a lid opening sensor 50. The lid opening sensor 50 can provide a verification of product usage input to the processor by signaling that the lid 48 is or has been opened. The processor 16 can use such an input to help guide or confirm the processor's 16 analysis of the captured sound profile in relation to the acoustic signature model to inform before or after signaling a qualifying match. In some embodiments, the disposal receptacle 44 can include other features as well, such as a lighting mechanism 64, that can provide assistance or enhance the enjoyment of use of the product.

For some products, an additional or alternative verification of product usage feature 42 can include the system 10 receiving one or more inputs from a body exudate detection sensor 52, as shown in FIG. 3. This may be of particular relevance in the circumstance for systems 10 that are seeking to document product usage where the product is an absorbent article 20. As illustrated in FIG. 3, a body exudate detection sensor 52 can be configured to provide a signal to the processor 16 to indicate a body exudate is present in the absorbent article 20 to provide a verification of product usage input to the system 10. As an example, the body exudate detection sensor 52 can be a capacitance-based detector, such as disclosed in U.S. Pat. No. 8,866,624 issued to Thomas Michael Ales, III et al., or an induction-based detector, such as disclosed in U.S. Pat. No. 8,207,394 issued to Joseph Raymond Feldkamp et al., or an infra-red-based detector, such as disclosed in U.S. Pat. App. Pub. No.

2010/0168694 by Sudhanshu Gakhar et al. Of course, it is to be appreciated that other body exudate detection sensors 52 other than those mentioned directly above may be configured to be part of the system 10 discussed herein. The body exudate detection sensor 52 can be configured to provide a verification of product usage input to the processor 16 to help guide or confirm the processor 16 in analyzing the captured use sound profile in relation to the acoustic signature model.

Yet another potential verification of product usage input can be implemented in the system 10 through the use of voice recognition technology. The system 10 can also be configured such that the memory 12 can store one or a plurality of words or phrases associated with the usage of the product. The auditory capture mechanism 14 can be configured to monitor the product use environment 18 for such word(s) or phrase(s) associated with product usage and capture potential product usage words or phrases. The processor 16 can be configured to include voice recognition capability to analyze the captured potential product usage words or phrases in relation to the stored one or more words or phrases. This voice recognition capability of the system 10 can provide a verification of product usage input to the processor 16 that can help guide or confirm the processor 16 in analyzing the captured use sound profile in relation to the acoustic signature model.

As an example in the described embodiment where the product is an absorbent article 20, the system 10 can be configured to store one or a plurality of words or phrases associated with the usage of the absorbent article 20. Such words or phrases can include, "wet diaper," "dirty diaper," "diaper change," "change time," "changing time," and/or "need to change your diaper," which can help confirm or guide the processor 16 in analyzing the captured use sound profile in relation to the acoustic signature model, and may help indicate that an absorbent article 20 has been fully used and a new absorbent article 20 will be applied to the wearer 22. Additional exemplary words or phrases that the system 10 could store and monitor for include "still dry", "your diaper is OK", and/or "don't need to change", which may help indicate that an absorbent article 20 has not been fully used and a new absorbent article 20 will not be applied to the wearer 22 yet.

In some embodiments, the system 10 can be configured to employ more than one verification of product usage input to help guide or confirm the processor 16 in analyzing the captured use sound profile in relation to the acoustic signature model. For example, the processor 16 can be configured to receive verification of product usage inputs from a lid open sensor 50 and/or a weight sensor 46 of a disposal receptacle 44, and/or inputs from a body exudate detection sensor 52, and/or inputs from voice recognition analysis as described above. In some embodiments, the system 10 can be configured to employ different logic schemes with the verification of product usage inputs to document a product usage. As one example, the system 10 could be configured to confirm a certain amount of verification of product usage inputs within a specified period of time, such as, requiring two or more verification of product usage inputs within five minutes to document a product usage.

In some embodiments, the system 10 can also include a user interface 54. The user interface 54 can be configured to allow a user to document a product usage that occurred outside of the product use environment(s) 18 being monitored by the auditory capture mechanism(s) 14. As illustrated in FIG. 1, the user interface 54 can be configured to be accessible from one, or more, mobile devices 56. Additionally or alternatively, the user interface 54 can be configured to be disposed on a disposal receptacle 44. The user interface 54 can help provide enhanced accuracy in the system 10 where a user 24 knows that one or more product(s) has been used outside of the monitored product use environment(s) 18 and the user 24 can document the usage of such product(s) on the system.

The system 10 can also provide an inventory management feature 58 (see FIG. 2). The inventory management feature 58 can be configured to provide a current product inventory for a user 24 by subtracting documented product usages from an initial product inventory. The initial product inventory can be compiled in various ways, depending on the type of product(s) being monitored and the purchasing habits of the user. For example, the initial product inventory in the system can be stored on the memory 12 of the system 10 and can be compiled and/or updated through information from a Rewards Program, such as the HUGGIES® Rewards Program. Additionally or alternatively, the initial product inventory can also be compiled and/or updated from a user's purchasing history for the product that is synced with a portal from a retailer or distributor. It is contemplated that the initial product inventory may also be compiled in various other platforms, such as through gift registrations, scanned UPCs, and/or RFID tag scanning (or similar). The initial product inventory can also be adjusted manually by a user 24 if the user 24 so desires or believes that a product usage may have occurred outside of a monitored product use environment 18. For example, manual adjustment of initial product inventory may be helpful in situations where the user 24 receives a gift of the product from another person, such that such additional inventory would not be documented by any automated system linked to the user 24.

The inventory management feature 58 can provide multiple benefits for a user 24 of a product. In some embodiments, the inventory management feature 58 of the system 10 can be configured to notify the user 24 of low inventory. In such an embodiment, the inventory management feature 58 can be configured to send an output to the user 24 conveying that the current inventory is less than or equal to a specified low product inventory threshold. Such a message could be configured as an e-mail, a Short Message Service (SMS) text message, an audio output from the system 10, or any other viable format to notify the user 24 of low product inventory. The low product inventory threshold can be configured based on the particular product and its frequency of use, the user's individual purchasing or storage habits, or other characteristics. In some embodiments, the inventory management feature 58 can be configured to automatically reorder more product when the current product inventory is less than or equal to the low product inventory threshold.

Such an inventory management feature 58 can provide the benefits of informing the user 24 to reorder, or even possibly automatically reorder, more product without requiring the user 24 to actively consider or manually look at the current product inventory. This can save the user 24 time and energy.

EMBODIMENTS

Embodiment 1: A system for documenting product usage of a product; the system comprising: a memory device configured to store an acoustic signature model, the acoustic signature model being representative of an acoustic profile of the product emitted during use of the product; an auditory capture mechanism configured to monitor a product use environment for a potential use sound profile and capture the potential use sound profile while the product is being used;

and a processor in electrical communication with the auditory capture mechanism, the processor configured to analyze the captured potential use sound profile in relation to the acoustic signature model, the processor further configured to signal a qualifying match when the captured potential use sound profile meets the acoustic signature model; wherein the system is configured to document a product usage when the processor signals the qualifying match.

Embodiment 2: The system of embodiment 1, wherein the processor is further configured to include a verification of product usage feature, the verification of product usage feature including a verification of product usage input.

Embodiment 3: The system of embodiment 2, further comprising a disposal receptacle, the disposal receptacle being in electrical communication with the processor and configured to provide the verification of product usage input.

Embodiment 4: The system of embodiment 3, wherein the disposal receptacle comprises a weight sensor, the weight sensor being configured to weigh the contents of the disposal receptacle, the verification of product usage input being an increase in sensed weight in the disposal receptacle.

Embodiment 5: The system of embodiment 3, wherein the disposal receptacle comprises a lid and a lid opening sensor, the verification of product usage input being the lid opening sensor signaling the lid is opened.

Embodiment 6: The system of any one of embodiments 2-5, wherein the product is an absorbent article, the system further comprising a body exudate sensor configured to detect a body exudate in the absorbent article, the body exudate sensor being in electrical communication with the processor and being configured to signal a body exudate being detected in the absorbent article as the verification of product usage input.

Embodiment 7: The system of any one of embodiments 2-6, wherein the memory is further configured to store a plurality of words or phrases associated with usage of the product, wherein the auditory capture mechanism is further configured to monitor the product use environment for the plurality of words or phrases associated with product usage and capture potential product usage words or phrases, and wherein the processor is further configured to have voice recognition configured to analyze the captured potential product usage words or phrases in relation to the stored plurality of words or phrases associated with usage of the product, and wherein the verification of product usage input being a confirmed use of at least one of the plurality of words or phrases associated with the product usage.

Embodiment 8: The system of any one of the preceding embodiments, further comprising a user interface, the user interface being configured to allow a user to document a product usage that occurred outside of the product use environment being monitored by the auditory capture mechanism.

Embodiment 9: The system of any one of the preceding embodiments, wherein the system is configured to connect with at least two auditory capture mechanisms, the at least two auditory capture mechanisms being configured to monitor at least two product use environments for potential use sound profiles and capture the potential use sound profiles while the product is being used.

Embodiment 10: The system of any one of the preceding embodiments, wherein the system is configured to provide a current product inventory by subtracting documented product usages from an initial product inventory.

Embodiment 11: The system of embodiment 10, wherein the system is configured to send an output conveying the current product inventory is less than or equal to a low product inventory threshold.

Embodiment 12: The system of embodiment 10 or embodiment 11, wherein the system is configured to automatically reorder more product when the current product inventory is less than or equal to a low product inventory threshold.

Embodiment 13: A computer program product comprising code embodied on a non-transitory computer-readable medium and configured to be executed on one or more processors, the computer program product being configured to perform operations of: storing an acoustic signature model of a product, the acoustic signature model being representative of an acoustic profile of the product emitted during use of the product; monitoring a product use environment for a potential use sound profile with an auditory capture mechanism; capturing the potential use sound profile with the auditory capture mechanism; analyzing the potential use sound profile in relation to the acoustic signature model of the product; signaling a qualifying match when the captured potential use sound profile meets the acoustic signature model of the product; and documenting a product usage when a qualifying match is signaled.

Embodiment 14: The computer program product of embodiment 13, wherein the computer program product is further configured to perform the operation of: verifying a product usage when a qualifying match is signaled through a verification of product usage feature.

Embodiment 15: The computer program product of embodiment 14, wherein the verification of product usage feature comprises a verification of product usage input, the verification of product usage input comprising a signal received from a disposal receptacle that includes a weight sensor, the signal indicating that the weight of the disposal receptacle increased after the qualifying match is signaled.

Embodiment 16: The computer program product of embodiment 14 or embodiment 15, wherein the verification of product usage feature comprises a verification of product usage input, the verification of product usage feature comprising a signal received from a disposal receptacle that includes a lid and a lid opening sensor, the signal indicating that the lid was opened after the qualifying match.

Embodiment 17: The computer program product of embodiment 14, wherein the product is an absorbent article, and wherein the verification of product usage feature comprises a verification of product usage input, and wherein the verification of product usage input being a signal of a body exudate sensor sensing a body exudate in the absorbent article.

Embodiment 18: The computer program product of any one of embodiments 13-17, wherein the computer program product is further configured to perform the operation of: allowing a user to document a product usage that occurred outside of the product use environment being monitored by the auditory capture mechanism.

Embodiment 19: The computer program product of any one of embodiments 13-18, wherein the computer program product is further configured to perform the operation of: monitoring at least two product use environments for potential use sound profiles with at least two auditory capture mechanisms and capture the potential use sound profiles while the product is being used.

Embodiment 20: The computer program product of any one of embodiments 13-19, wherein the computer program product is further configured to perform the operation of:

providing a current product inventory for a user by subtracting documented product usages from an initial product inventory.

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by references, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for documenting product usage of a product; the system comprising:
    a memory device configured to store an acoustic signature model, the acoustic signature model being representative of an acoustic profile of the product emitted during use of the product and correlating to the product being fully consumed;
    an auditory capture mechanism configured to monitor a product use environment for a potential use sound profile and capture the potential use sound profile while the product is being used; and
    a processor in electrical communication with the auditory capture mechanism, the processor configured to analyze the captured potential use sound profile in relation to the acoustic signature model, the processor further configured to signal a qualifying match when the captured potential use sound profile meets the acoustic signature model;
    wherein the system is configured to document a product usage when the processor signals the qualifying match, the product usage correlating to the product being fully consumed.

2. The system of claim 1, wherein the processor is further configured to include a verification of product usage feature, the verification of product usage feature including a verification of product usage input, and wherein the processor is configured to analyze the verification of product usage input to inform signaling of the qualifying match.

3. The system of claim 2, further comprising a disposal receptacle, the disposal receptacle being in electrical communication with the processor and configured to provide the verification of product usage input.

4. The system of claim 3, wherein the disposal receptacle comprises a weight sensor, the weight sensor being configured to weigh the contents of the disposal receptacle, the verification of product usage input being an increase in sensed weight in the disposal receptacle.

5. The system of claim 3, wherein the disposal receptacle comprises a lid and a lid opening sensor, the verification of product usage input being the lid opening sensor signaling the lid is opened.

6. The system of claim 2, wherein the product is an absorbent article, the system further comprising a body exudate sensor configured to detect a body exudate in the absorbent article, the body exudate sensor being in electrical communication with the processor and being configured to signal a body exudate being detected in the absorbent article as the verification of product usage input.

7. The system of claim 2, wherein the memory is further configured to store a plurality of words or phrases associated with usage of the product, wherein the auditory capture mechanism is further configured to monitor the product use environment for the plurality of words or phrases associated with product usage and capture potential product usage words or phrases, and wherein the processor is further configured to have voice recognition configured to analyze the captured potential product usage words or phrases in relation to the stored plurality of words or phrases associated with usage of the product, and wherein the verification of product usage input being a confirmed use of at least one of the plurality of words or phrases associated with the product usage.

8. The system of claim 1, further comprising a user interface, the user interface being configured to allow a user to document a product usage that occurred outside of the product use environment being monitored by the auditory capture mechanism.

9. The system of claim 1, wherein the system is configured to connect with at least two auditory capture mechanisms, the at least two auditory capture mechanisms being configured to monitor at least two product use environments for potential use sound profiles and capture the potential use sound profiles while the product is being used.

10. The system of claim 1, wherein the system is configured to provide a current product inventory by subtracting documented product usages from an initial product inventory.

11. The system of claim 10, wherein the system is configured to send an output conveying the current product inventory is less than or equal to a low product inventory threshold.

12. The system of claim 10, wherein the system is configured to automatically reorder more product when the current product inventory is less than or equal to a low product inventory threshold.

13. A computer program product comprising code embodied on a non-transitory computer-readable medium and configured to be executed on one or more processors, the computer program product being configured to perform operations of:
    storing an acoustic signature model of a product, the acoustic signature model being representative of an acoustic profile of the product emitted during use of the product;
    monitoring a product use environment for a potential use sound profile with an auditory capture mechanism;
    capturing the potential use sound profile with the auditory capture mechanism;
    analyzing the potential use sound profile in relation to the acoustic signature model of the product;
    signaling a qualifying match when the captured potential use sound profile meets the acoustic signature model of the product;
    verifying a product usage when a qualifying match is signaled through a verification of product usage feature; and
    documenting a product usage when a qualifying match is signaled and verified through the verification of product usage feature.

14. The computer program product of claim 13, wherein the verification of product usage feature comprises a verification of product usage input.

15. The computer program product of claim 14, wherein the verification of product usage input comprises a signal received from a disposal receptacle that includes a weight sensor, the signal indicating that the weight of the disposal receptacle increased after the qualifying match is signaled.

16. The computer program product of claim 14, wherein the verification of product usage feature comprises a signal received from a disposal receptacle that includes a lid and a lid opening sensor, the signal indicating that the lid was opened after the qualifying match.

17. The computer program product of claim 14, wherein the product is an absorbent article, and wherein the verification of product usage input comprises a signal of a body exudate sensor sensing a body exudate in the absorbent article.

18. The computer program product of claim 13, wherein the computer program product is further configured to perform the operation of:

allowing a user to document a product usage that occurred outside of the product use environment being monitored by the auditory capture mechanism.

19. The computer program product of claim 13, wherein the computer program product is further configured to perform the operation of:

monitoring at least two product use environments for potential use sound profiles with at least two auditory capture mechanisms and capture the potential use sound profiles while the product is being used.

20. The computer program product of claim 13, wherein the computer program product is further configured to perform the operation of:

providing a current product inventory for a user by subtracting documented product usages from an initial product inventory.

\* \* \* \* \*